US006823326B2

(12) United States Patent
Teng et al.

(10) Patent No.: US 6,823,326 B2
(45) Date of Patent: Nov. 23, 2004

(54) METHOD AND SYSTEM FOR PERFORMING ASYNCHRONOUS PREFORMATTING IN A DATABASE SYSTEM

(75) Inventors: James Zu-Chia Teng, San Jose, CA (US); Namik Hrle, Boeblingen (DE); Akira Shibamiya, Los Altos, CA (US); Stephen Walter Turnbaugh, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/823,062

(22) Filed: Mar. 30, 2001

(65) Prior Publication Data

US 2002/0143732 A1 Oct. 3, 2002

(51) Int. Cl.[7] .......................... G06F 17/30; G06F 12/00
(52) U.S. Cl. ........................................ 707/1; 711/170
(58) Field of Search .................. 707/1, 100, 104.1; 711/170, 173, 171, 172; 710/17; 369/52.1, 47.1

(56) References Cited

U.S. PATENT DOCUMENTS

| | | | |
|---|---|---|---|
| 4,924,330 A | * 5/1990 | Seamons et al. | 360/66 |
| 5,758,144 A | 5/1998 | Eberhard et al. | 395/602 |
| 6,003,022 A | 12/1999 | Eberhard et al. | 707/2 |
| 6,009,058 A | * 12/1999 | Sims et al. | 369/53.28 |
| 6,172,955 B1 | * 1/2001 | Hashimoto | 369/58 |
| 6,401,168 B1 | * 6/2002 | Williams et al. | 711/112 |

* cited by examiner

*Primary Examiner*—Uyen Le
(74) *Attorney, Agent, or Firm*—Sawyer Law Group LLP

(57) ABSTRACT

A method and system for formatting space in a storage device for a database system is disclosed. The method and system include formatting a first increment for creating a database file and asynchronously formatting at least one subsequent increment for the database file in a background of the database system.

21 Claims, 3 Drawing Sheets

METHOD AND SYSTEM FOR PERFORMING ASYNCHRONOUS PREFORMATTING IN A DATABASE SYSTEM

FIELD OF THE INVENTION

The present invention relates to computer systems, and more particularly to a method and system for performing formatting asynchronously in a database system.

BACKGROUND OF THE INVENTION

Conventional database management systems are used for a variety of applications. FIG. 1 depicts a portion of a computer system 10 on which the conventional database system operates. The computer system 10 is typically platform, such as a server. The computer system 10 a processor 12, includes a storage device, such as a disk 14, and an input/output device 16, such as a keyboard and display, which may be coupled to a workstation. In order to operate the conventional database system, a portion of the disk 14 is formatted to allow data input to the database system to be stored. This formatting is specific to the conventional database system desired to be used. In general, each conventional database system utilizes a particular format for storing and accessing data. The computer system 10 might support a variety of conventional database systems, as well as other applications. Thus, each time a particular conventional database system is to be used to store data, some portion of the disk 14 is formatted for that particular conventional database system. The formatting might include overwriting a portion of the disk as well as providing control information to allow the conventional database system to access the stored data. Typically, only a portion of the disk 14 is formatted because other applications might use remaining portions of the disk 14 to store data. Furthermore, formatting for a particular conventional database system is performed by the conventional database system only during operation of the conventional database system.

FIG. 2 depicts a conventional method 20 for formatting a storage device, such as the disk 14, for use by a conventional database system. Thus, the conventional method 20 may be considered to be part of and carried out by a conventional database system. The conventional method 20 is described in conjunction with the computer system 10. Referring to FIGS. 1 and 2, the conventional method 20 commences after a new file for the conventional database system is created. For example, the conventional method 20 may begin when a use opens a new table for storing data. A first element of the disk drive is formatted by the conventional database management system, via step 22. The size of the element in step 22 may depend upon the particular conventional database system. The actual formatting in step 22 may include using a mask to write a specific pattern in the element as well as providing control information, for example in a header. Input from and output to a user, as well as storage of data on the disk 14 are carried out, via step 24. It is determined whether data is to be stored such that the end of the current (first) increment is reached, via step 26. If not, then operation continues in step 24. However, if the end of the increment has been reached, then a new element is formatted for use by the conventional database system, via step 28. Any data that was to be stored but could not because the end of the first element was reached is then stored in the new element, via step 30. Thus, access to the disk 14 by the database system is stalled during formatting of the next increment in step 30. The method then returns to normal operations in step 24. The method 20 is typically repeated until the file for the database system is closed.

Thus, the conventional method 20 allows the conventional database system to format increments and store data on a storage device such as the disk 14, one of ordinary skill in the art will readily realize that the conventional method 20 results in delays to the user. The conventional method 20 formats a new increment only when a current increment is filled. Thus, if the data being stored would exceed space available in the current increment, then the storage operation is delayed until the subsequent increment is formatted. Once the subsequent increment is formatted, the data may be stored and operation can continue. For large amounts of data being stored, this delay may be significant, for example up to several seconds. Thus, the user becomes aware of a delay in inputting data to the conventional database system. This slowdown in performance of the conventional database management system is undesirable.

Accordingly, what is needed is a system and method for more efficiently formatting the storage device. The present invention addresses such a need.

SUMMARY OF THE INVENTION

The present invention provides a method and system for formatting space in a storage device for a database system. The method and system comprise formatting a first increment in the storage device for creating a database file and asynchronously formatting at least one subsequent increment in the storage device for the database file in a background of the database system.

According to the system and method disclosed herein, the present invention allows space on a disk to be formatted while allowing the user to experience reduced delays in processing input requests.

DETAILED DESCRIPTION OF THE INVENTION

The present invention relates to an improvement in database systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional database management systems are used for storing and performing a variety of operations on data. Each database management system typically utilizes a particular format for storing data. Thus, each conventional database management system must typically format a portion of a storage device during operation. In order to store data, the conventional database management system formats a new increment only once it is determined that the present formatted increment is to be filled. During formatting of the new increment, access to the storage device by the conventional database system is suspended. As a result, a user might experience a delay each time an increment is filled. Thus, performance of the conventional database management system is adversely affected.

The present invention provides a method and system for formatting space in a storage device for a database system. The method and system comprise formatting a first increment in the storage device for creating a database file and asynchronously formatting at least one subsequent increment in the storage device for the database file as a background process.

The present invention will be described in terms of method having particular steps. However, one of ordinary skill in the art will readily recognize that this method and system will operate effectively for other methods consistent with the present invention having additional or different steps. The present invention is described in the context of a particular type of storage device, a disk. However, one of ordinary skill in the art will readily recognize that the method and system are consistent with the use of another storage device. Furthermore, the present invention will be described in terms of particular components in a system and particular steps in a method. However, one of ordinary skill in the art will realize that certain steps or components have been omitted for clarity.

Figure 3:
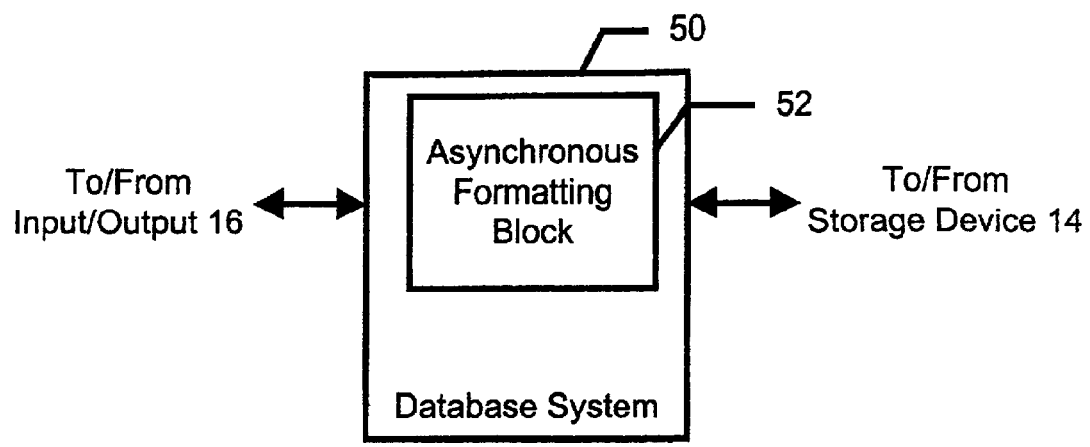
FIG. 3 is a high level block diagram of a database system in accordance with the present invention.

To more particularly illustrate the method and system in accordance with the present invention, refer now to FIG. 3, depicting a high-level block diagram of a database system 50 in accordance with the present invention. The database system 50 may be used in computer system 10 and is preferably implemented by the processor 12. The database system 50 is coupled with the input/output 16 in order to receive and display data. The database system 50 is also coupled with the storage device 14 in order to store and retrieve data. The database system 50 includes an asynchronous formatting block 52. The asynchronous formatting block 52 allows the database system 50 to asynchronously format increments during operation of the database system 50. In particular, the asynchronous formatting block 52 allows the database system to format increments in the background of the database system 50 without waiting for the end of a current increment to be reached. Operation of the asynchronous formatting block 52 is more particularly described below in the methods 100 and 110. Thus, the access delays associated formatting subsequent increments during operation of the database system 50 are reduced.

Figure 1:
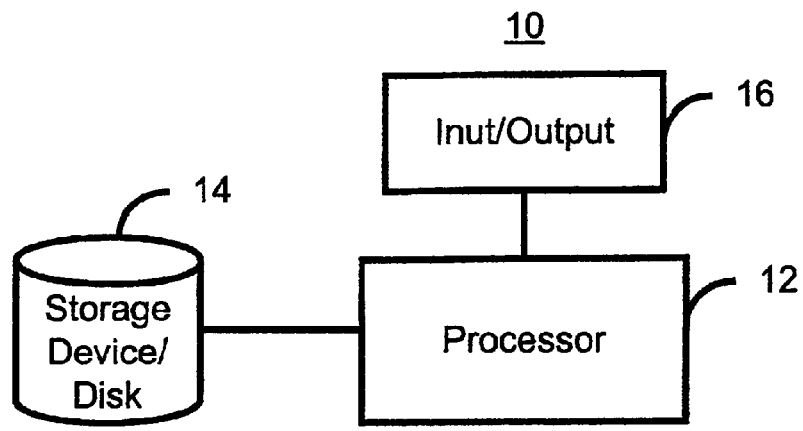
FIG. 1 is a block diagram of a conventional computer system in which the present invention may be utilized.
Figure 2:
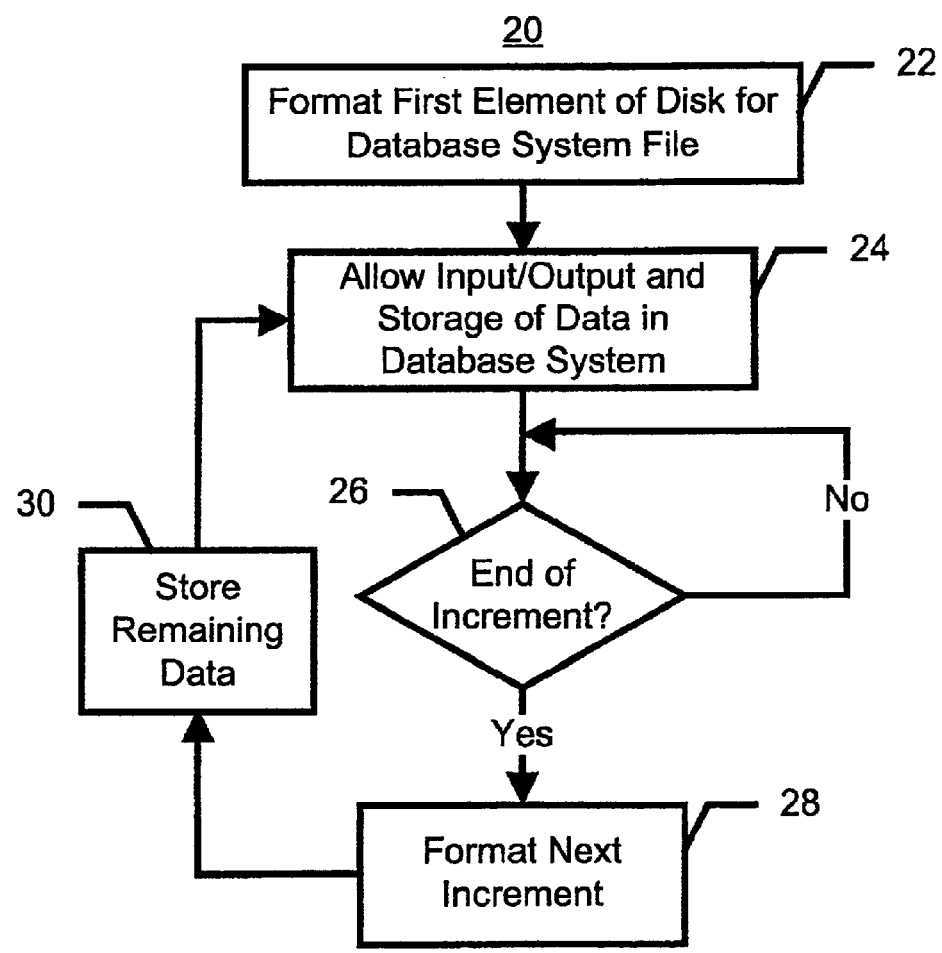
FIG. 2 is a flow chart depicting a conventional method for formatting a storage device for a database system.
Figure 4:
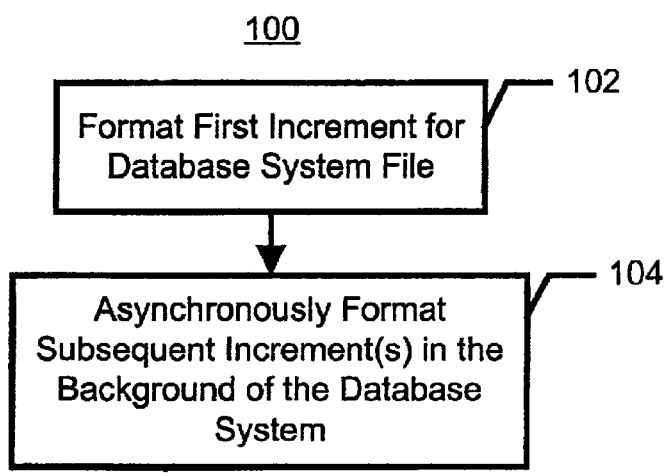
FIG. 4 is a high level flow chart of one embodiment of a method in accordance with the present invention for formatting a storage device of a database system.

FIG. 4 depicts a high-level flow chart of one embodiment of a method 100 for formatting a storage device for use by a database system. The method 100 is preferably included in the database management system 50 and is preferably implemented using the asynchronous formatting block 52. The method 100 is described in the context of the conventional system 10. The method 100 preferably commences after a new file for the database system 50 is opened. For example, the method 100 may begin after a new table is opened for use. Referring to FIGS. 1 and 4, the first increment of the storage device, such as the disk drive 14, is formatted, via step 102. The size of the increment preferably depends upon the application. However, in a preferred embodiment, each increment formatted has the same size. Subsequent increment(s) in the storage device 14 are asynchronously formatted concurrently in the background of the database system 50, preferably as a background process, via step 104. Formatting the increment in step 104 preferably includes overwriting the increment with all zeroes, which allows the database system 50 to rapidly determine whether a particular increment has been utilized for storage. Step 104 might also include providing control data in the increment during formatting. Formatting of the subsequent increments is considered asynchronous because formatting is not based upon the end of the previous increment being reached. In a preferred embodiment, formatting of a subsequent increment begins when the previous increment is first used to store data. In alternate embodiments, asynchronous formatting could begin when a particular threshold for the previous increment is reached or could be performed continuously.

Using the method 100, increments of a storage device such as a disk drive 14 can be formatted asynchronously. As a result, a user need not have to wait because formatting commences when an input operation is pending. In addition, because asynchronous formatting is performed in the background, normal operation of the database system 50 may not be adversely affected. In other words, a user could continue to input data and data could be stored in parallel with the formatting performed in step 104 of the method 100. Consequently, performance of the database system 50 is improved.

Figure 5:
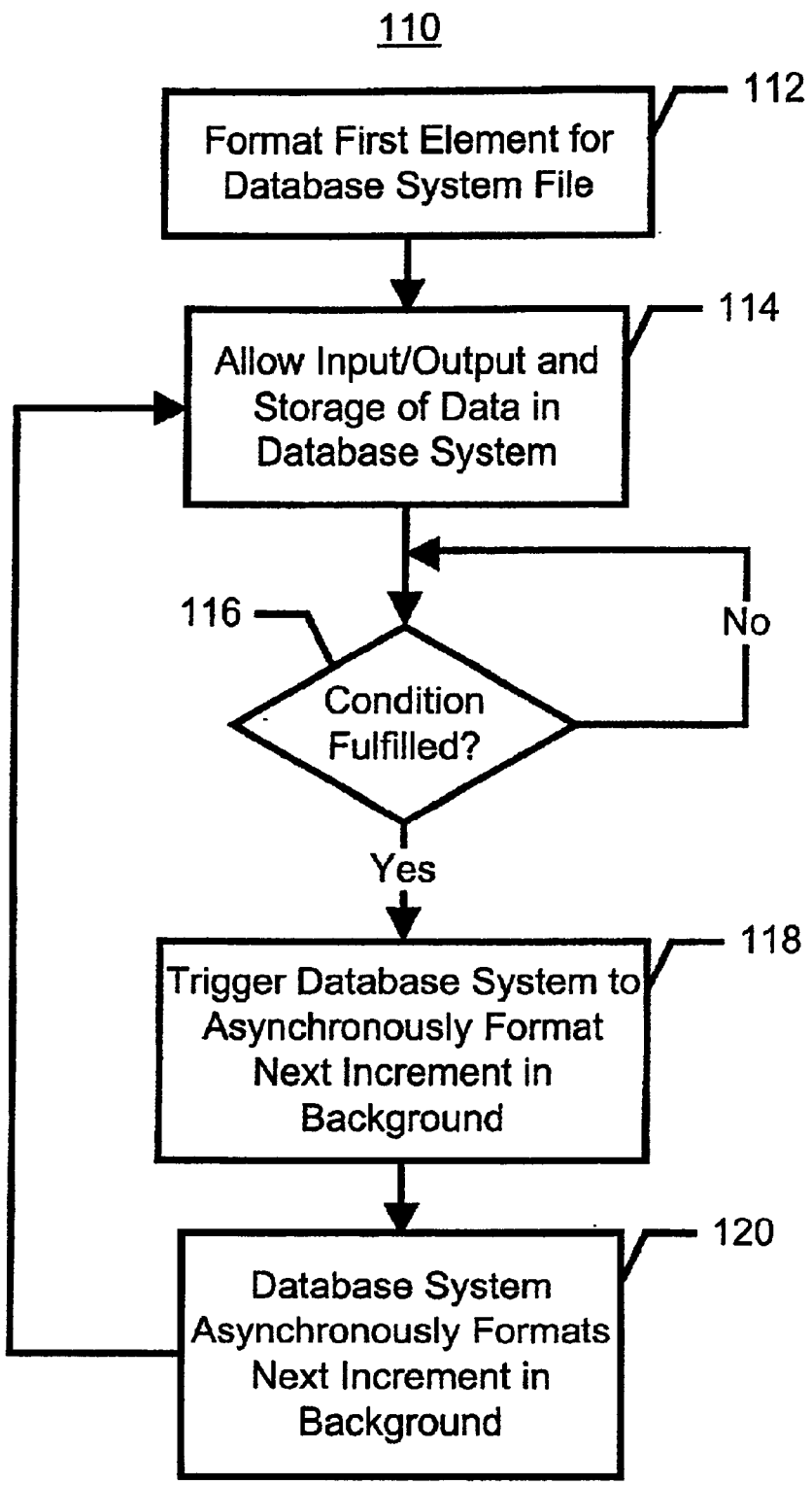
FIG. 5 is a flow chart of one embodiment of a method in accordance with the present invention for formatting a storage device of a database system.

FIG. 5 is a more detailed flow chart of one embodiment of a method 110 in accordance with the present invention for formatting a storage device for use by a database system 50. The method 100 is preferably included in the database management system 50 and is preferably implemented using the asynchronous formatting block 52. The method 110 is described in the context of the conventional system 10. The method 110 preferably commences after a new file for the database system 50 is opened. For example, the method 110 may begin after a new table is opened for use. Referring to FIGS. 1 and 5, the first increment of the storage device, such as the disk drive 14, is formatted, via step 112. The size of the increment preferably depends upon the application. However, in a preferred embodiment, each increment formatted has the same size. Input from and output to a user, as well as storage of data on the disk 14 are carried out, via step 114. Thus, normal operation of the database system 50 is carried out in step 114. It is determined whether a particular condition relating to formatting is satisfied, via step 116. In a preferred embodiment, the condition is the first use of the increment currently in use (e.g. the first increment when only the first increment has been formatted). In an alternate embodiment, the condition could be a particular threshold being reached and/or exceeded. In such an embodiment, the threshold might be one-half of the space available in the current increment. The threshold of one-half is selected because it is possible that a higher threshold might result in delays where large amounts of information are being input to the file for the database. A higher threshold might result in delays because the large amounts of information might fill the capacity of the current increment prior to the subsequent increment being formatted.

If the condition has not been fulfilled, then normal operation of the database system is continued in step 114. However, if the condition has been fulfilled, then the database system is triggered to commence asynchronous formatting of a subsequent increment in the background, via step 118. The database system formats the subsequent increment in the background, via step 120. Formatting the increment in step 120 preferably includes overwriting the increment with all zeroes, which allows the database system 50 to rapidly determine whether a particular increment has been utilized for storage. Step 120 might also include providing control data in the increment during formatting. Normal operation is also carried out in step 114. Thus, steps 114 and 120 may be performed in parallel.

Using the method 110, increments of a storage device such as a disk drive 14 can be formatted asynchronously. As a result, a user need not have to wait because formatting commences when an input operation is pending. In addition, because asynchronous formatting is performed in the background, normal operation of the database system may not be adversely affected. Consequently, performance of the database system is improved.

A method and system has been disclosed for asynchronously formatting files for a database system. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for formatting space on a storage device for a database system, the method comprising the steps of:
   (a) formatting a first increment in the storage device for creating a database file; and
   (b) asynchronously formatting at least one subsequent increment in the storage device for the database file as a concurrent task of the database system, wherein the asynchronously formatting step (b) further includes the step of:
   (b1) asynchronously formatting the at least one subsequent increment in response to occupation of a previous increment reaching a threshold of less than one hundred percent occupation of the previous increment.

2. The method of claim 1 wherein the concurrent task is a background process.

3. The method of claim 2 wherein the previous increment has a threshold of one-half.

4. A method for formatting space on a storage device for a database system, the method comprising the steps of:
   (a) formatting a first increment in the storage device for creating a database file; and
   (b) asynchronously formatting at least one subsequent increment in the storage device for the database file as a concurrent task of the database system; wherein the asynchronously formatting step (b) further includes the step of:
   (b1) starting formatting of the at least one subsequent increment for the database file as a background process when data are first being stored in a previous increment.

5. A method for formatting space in a storage device for a database system, the method comprising the steps of:
   (a) formatting a first increment in the storage device for creating a database file;
   (b) triggering the database system to asynchronously format at least one subsequent increment in response to occupation of the a previous increment reaching a threshold; and
   (c) asynchronously formatting at least one subsequent increment for the database file as a concurrent task;
   wherein the threshold is less than one hundred percent occupation of the previous increment.

6. The method of claim 5 wherein the concurrent task is a background process.

7. A computer-readable medium containing a program for formatting space in a storage device for a database system, the program including instructions for:
   (a) formatting a first increment in the storage device for creating a database file; and
   (b) asynchronously formatting at least one subsequent increment in the storage device for the database file as a concurrent task of the database system, wherein the asynchronously formatting instruction (b) further includes instructions for:
   (b1) asynchronously formatting the at least one subsequent increment for the database file in response to occupation of a previous increment reaching a threshold of less than one hundred percent occupation of the previous increment.

8. The computer-readable medium of claim 7 wherein the concurrent task is a background process.

9. The computer-readable medium of claim 8 wherein the previous increment has a threshold of one-half.

10. A computer-readable medium containing a program for formatting space in a storage device for a database system, the program including instructions for:
    (a) formatting a first increment in the storage device for creating a database file; and
    (b) asynchronously formatting at least one subsequent increment in the storage device for the database file as a concurrent task of the database system, wherein the asynchronously formatting instruction (b) further includes instructions for:
    (b1) starting formatting of the at least one subsequent increment for the database file as a background process when data are first being stored in a previous increment.

11. A computer-readable medium for formatting space in a storage device for a database system, the method comprising the steps of:
    (a) formatting a first increment in the storage device for creating a database file;
    (b) triggering the database system to asynchronously format at least one subsequent increment in response to occupation of a previous increment reaching a particular threshold; and
    (c) asynchronously formatting at least one subsequent increment for the database file as a concurrent task;
    wherein the threshold is less than one hundred percent occupation of the previous increment.

12. The computer-readable medium of claim 11 wherein the concurrent task is a background process.

13. A computer system for storing and retrieving data, the computer system comprising:
    a storage device for archiving the data;
    a database system coupled with the storage device, to control storing and retrieving the data, the database system including a formatting block for formatting a first increment of the storage device to store a portion of a database file and for asynchronously formatting at least one subsequent increment in the storage device for the database file as a concurrent task of the database system;

wherein the formatting block asynchronously formats the at least one subsequent increment by formatting the at least one subsequent increment for the database file in response to occupation of a previous increment reaching a threshold of less than one hundred percent occupation of the previous increment.

14. The computer system of claim 13 wherein the concurrent task is a background process.

15. The computer system of claim 14 wherein the previous increment has a threshold of one-half.

16. A computer system for storing and retrieving data, the computer system comprising:

a storage device for archiving the data;

a database system coupled with the storage device, to control storing and retrieving the data, the database system including a formatting block for formatting a first increment of the storage device to store a portion of a database file and for asynchronously formatting at least one subsequent increment in the storage device for the database file as a concurrent task of the database system;

wherein the formatting block asynchronously formats the at least one subsequent increment by starting formatting of the at least one subsequent increment for the database file as a background process when data are first being stored in a previous increment.

17. A computer system storing and retrieving data, the computer system comprising:

a storage device for archiving the data; and a database system coupled with the storage device, for storing and retrieving the data, the database system including a formatting block for formatting a first increment in the storage device for creating a database file, triggering the database system to asynchronously format at least one subsequent increment in response to occupation of a previous increment reaching a threshold of less than one hundred percent occupation of the previous increment, and asynchronously formatting at least one subsequent increment for the database file as a concurrent task.

18. The computer system of claim 17 wherein the concurrent task is a background process.

19. The method of claim 4 wherein the formatting step (b1) further includes:

(b1i) only formatting the at least one subsequent increment for use by the database system by starting formatting of the at least one subsequent increment for the database file as a background process when data are first being stored in a previous increment.

20. The computer-readable medium of claim 10 wherein the formatting instructions (b1) further includes:

(b1i) only formatting the at least one subsequent increment for use by the database system by starting formatting of the at least one subsequent increment for the database file as a background process when data are first being stored in a previous increment.

21. The computer system of claim 16 wherein the formatting block only formats the at least one subsequent increment by starting formatting of the at least one subsequent increment for the database file as a background process when data are first being stored in a previous increment.

* * * * *